(12) United States Patent
Sasaki et al.

(10) Patent No.: US 11,148,634 B2
(45) Date of Patent: Oct. 19, 2021

(54) VEHICLE BODY STRUCTURE

(71) Applicant: HONDA MOTOR CO., LTD., Tokyo (JP)

(72) Inventors: Masato Sasaki, Wako (JP); Kazutada Sasaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 117 days.

(21) Appl. No.: 16/510,324

(22) Filed: Jul. 12, 2019

(65) Prior Publication Data

US 2020/0023806 A1 Jan. 23, 2020

(30) Foreign Application Priority Data

Jul. 17, 2018 (JP) .............................. JP2018-133991

(51) Int. Cl.
*B60R 21/38* (2011.01)

(52) U.S. Cl.
CPC ..................... *B60R 21/38* (2013.01)

(58) Field of Classification Search
CPC .................................................. B60R 21/38
See application file for complete search history.

(56) References Cited

U.S. PATENT DOCUMENTS

| 7,997,375 | B2 * | 8/2011 | Shaw | ...................... | B60R 21/38 180/274 |
| 8,534,410 | B2 * | 9/2013 | Nakaura | .................. | B60R 21/38 180/274 |
| 9,010,478 | B2 * | 4/2015 | Fritzon | ................ | B62D 25/105 180/274 |
| 9,573,560 | B1 * | 2/2017 | Narita | ..................... | B60R 21/38 |
| 9,963,103 | B2 * | 5/2018 | Nomura | ............... | B62D 25/105 |
| 9,988,011 | B2 * | 6/2018 | Battermann | ............ | B60R 21/36 |
| 10,239,484 | B2 * | 3/2019 | Hwang | ................... | B62D 25/12 |
| 2010/0244484 | A1 * | 9/2010 | Nakaura | ................. | B60R 21/38 296/187.04 |
| 2010/0263957 | A1 * | 10/2010 | Shaw | ..................... | B60R 21/38 180/281 |
| 2014/0132036 | A1 * | 5/2014 | Fritzon | ............... | B62D 25/105 296/193.11 |
| 2016/0016533 | A1 * | 1/2016 | Lindmark | ............. | B62D 25/12 296/193.11 |
| 2017/0057457 | A1 | 3/2017 | Narita et al. | | |

(Continued)

FOREIGN PATENT DOCUMENTS

JP 2017-043210 A 3/2017

*Primary Examiner* — Barry Gooden, Jr.
(74) *Attorney, Agent, or Firm* — Rankin, Hill & Clark LLP

(57) ABSTRACT

The present invention addresses the problem of enlarging a clearance between an engine room and a hood so as to reduce an impact when a protection target collides with a vehicle body and suitably prevent the collision between the protection target and a windshield lower and/or a wiper. This vehicle body structure includes: a hood provided at a vehicle body; and a shift mechanism by which the hood is moved relative to the vehicle body, wherein the shift mechanism supports the hood movable with respect to the vehicle body and moves the hood upward and rearward with respect to the vehicle body. The vehicle body includes a wiper configured to wipe a front window W and the shift mechanism moves the hood to a position where the hood and at least part of the wiper overlap in a vertical direction.

5 Claims, 8 Drawing Sheets

(56) References Cited

U.S. PATENT DOCUMENTS

| | | | | |
|---|---|---|---|---|
| 2017/0217400 A1* | 8/2017 | Battermann | ............ | B60R 21/36 |
| 2018/0141516 A1* | 5/2018 | Hwang | ................... | B60R 21/38 |
| 2020/0062202 A1* | 2/2020 | Umezawa | ............... | B60R 21/36 |
| 2020/0207304 A1* | 7/2020 | Sasaki | ..................... | E05D 11/00 |
| 2020/0262386 A1* | 8/2020 | Sasaki | ..................... | E05B 83/24 |
| 2020/0269931 A1* | 8/2020 | Sasaki | .................. | E05B 83/243 |
| 2020/0290682 A1* | 9/2020 | Sasaki | ..................... | E05D 3/125 |
| 2020/0290683 A1* | 9/2020 | Sasaki | ..................... | E05B 81/16 |

\* cited by examiner

VEHICLE BODY STRUCTURE

TECHNICAL FIELD

The present invention relates to a vehicle body structure by which a protection target such as a pedestrian is protected.

BACKGROUND ART

Conventionally, such a vehicle body structure as disclosed in JP2017-43210A has been known.

JP2017-43210A discloses a pop-up hood device used to lift a hood provided at a front section of a vehicle body. The pop-up hood device includes a rear pop-up hood device, which lifts a rear end portion of the hood, and a front pop-up hood device, which lifts a front end portion of the hood. When a collision detection sensor, such as a camera, detects a collision with a protection target, the pop-up hood device is actuated by a control unit and then lifts the hood. This makes it possible to enlarge a clearance between an engine room and the hood, thereby reducing an impact when the protection target collides with the vehicle body.

SUMMARY OF INVENTION

Technical Problem

Unfortunately, in the vehicle body structure of JP2017-43210A, the pop-up hood device is used to make the hood move vertically. Because of this structure, the hood cannot cover a wiper and/or a windshield lower which have high rigidity and are positioned at a lower portion of a front window. Thus, a protection target, who is over the hood, may collide with the windshield lower and the wiper, etc.

The present invention has been made in view of the above point. An aspect of the present invention provides a vehicle body structure such that a clearance between an engine room and a hood can be enlarged so as to reduce an impact when a protection target collides with a vehicle body and the collision between the protection target and a windshield lower and/or a wiper, etc., can be suitably prevented.

Solution to Problem

The present invention may provide a vehicle body structure comprising: a hood provided at a vehicle body; and a shift mechanism by which the hood is shifted relative to the vehicle body, wherein the shift mechanism supports the hood movable with respect to the vehicle body and shifts the hood upward and rearward with respect to the vehicle body.

Advantageous Effects of Invention

The present invention may provide a vehicle body structure such that a clearance between an engine room and a hood can be enlarged so as to reduce an impact when a protection target collides with a vehicle body and the collision between the protection target and a windshield lower and/or a wiper can be suitably prevented.

DESCRIPTION OF EMBODIMENTS

Figure 1:
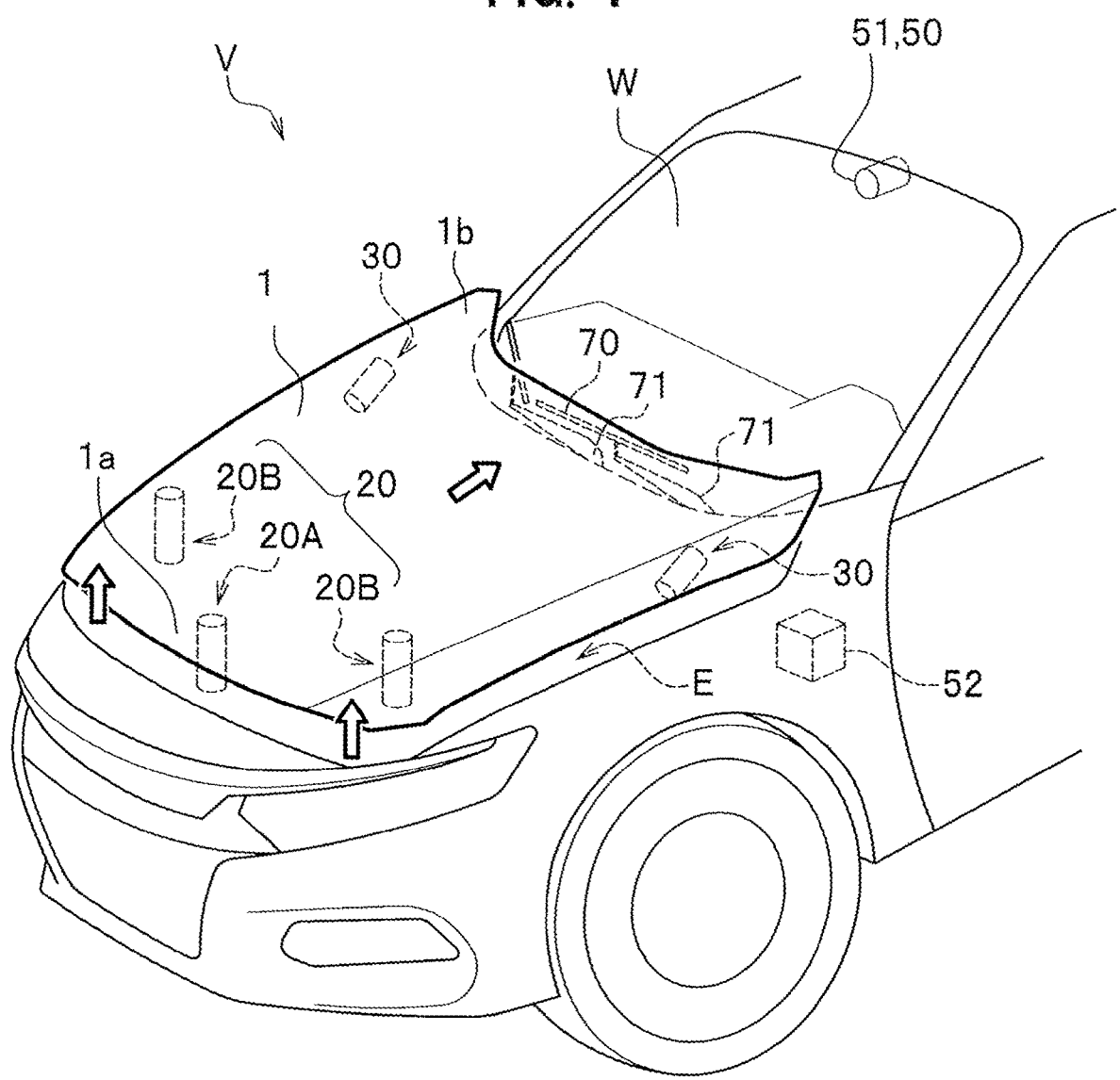
FIG. 1 is a partial perspective view of a front section of a vehicle body and indicates a state in which a hood is operated in a vehicle body structure according to a first embodiment of the present invention.

Next, embodiments of the present invention are described in detail by appropriately referring to the Drawings. Hereinafter, the same elements have the same reference numerals so as to avoid redundancy. Directions are described based on the front-rear, left-right, up-down directions when viewed from a driver.

First Embodiment

Figure 2:
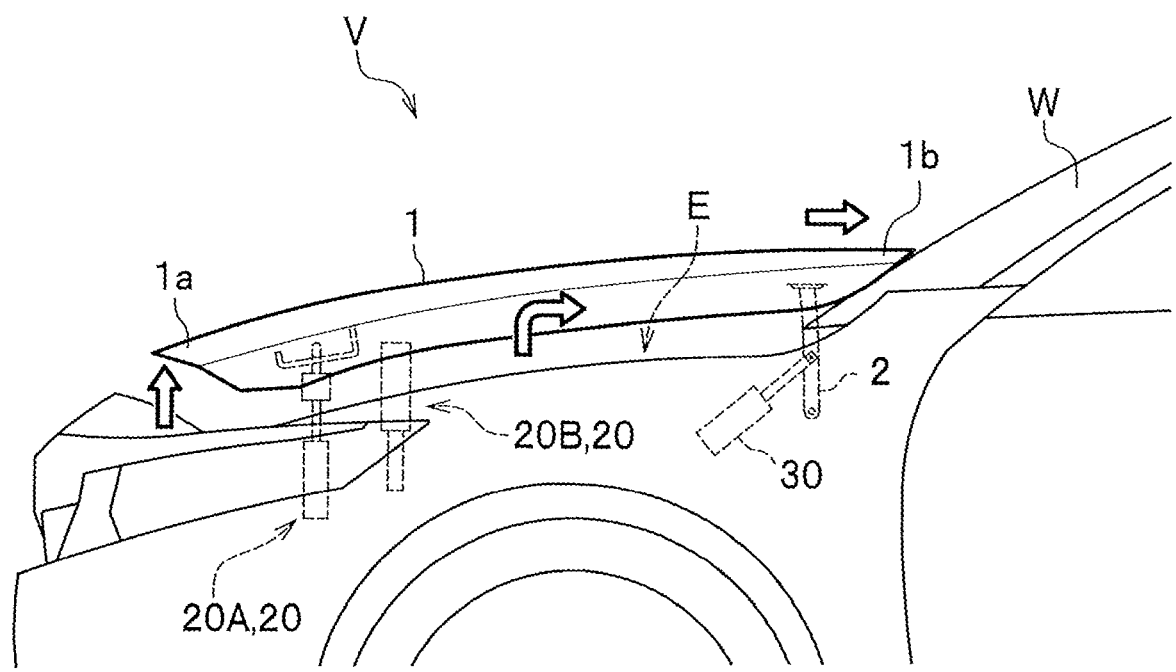
FIG. 2 is a partial side view of the front section of the vehicle body and indicates the state in which the hood is operated as above.
Figure 2:
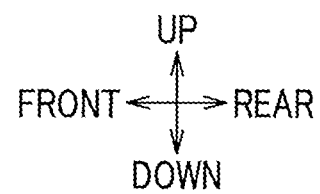

As shown in FIGS. 1 and 2, a vehicle V having a vehicle body structure according to this embodiment includes a hood 1 that is positioned at a front section of the vehicle body and covers an upper surface of an engine room E. In addition, the vehicle V is provided with a shift mechanism by which the hood 1 can be shifted relative to the vehicle body. The shift mechanism is configured to support the hood 1 movable with respect to the vehicle body and shifts (translates) the hood 1 upward and rearward with respect to the vehicle body.

As shown in FIG. 2, the shift mechanism includes a front actuator 20, which lifts a front portion of the hood 1, and each rear actuator 30, which lifts a rear portion of the hood 1.

Figure 3A:
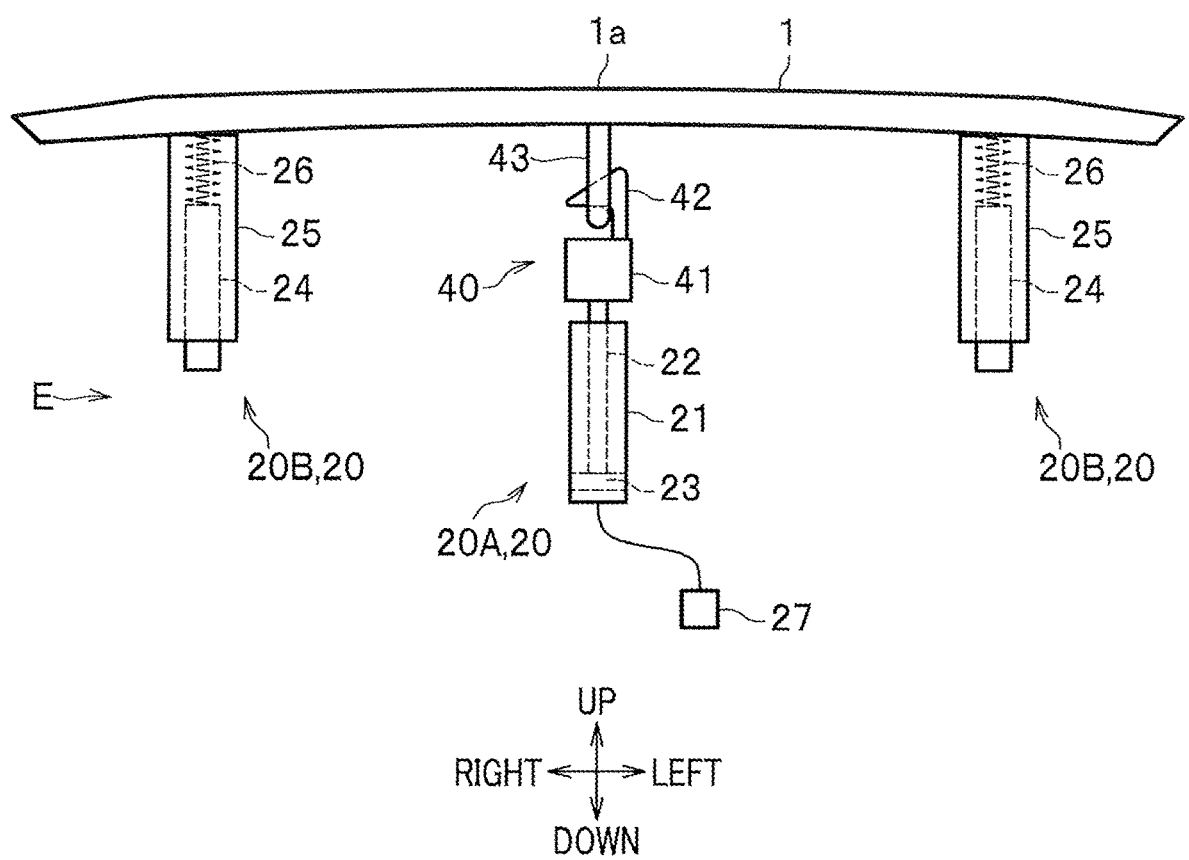
FIG. 3A is a schematic diagram illustrating the hood and a front actuator when viewed from the front side of the vehicle body.

Specifically, as shown in FIG. 3A, the front actuator 20 includes a main actuator 20A and a pair of left and right driven actuators 20B and 20B. The main actuator 20A is arranged on the lower side at a front end center portion of the hood 1. A locking device 40 for keeping the hood 1 closed is arranged between the hood 1 and the main actuator 20A (see FIG. 4). The main actuator 20A, the driven actuators 20B, and the rear actuators 30 are supported at given sites in the engine room E.

The main actuator 20A includes a tubular cylinder 21 and a rod 22 that can be displaced in the axial direction of the cylinder 21. The cylinder 21 houses a piston part 23 that is slidable in a vertical direction. A lower end of the rod 22 is connected to this piston part 23. An upper portion of the rod 22 extends upwardly of the cylinder 21. An upper end of the rod is attached to the bottom of a base part 41 of the locking device 40. The base part 41 is provided with a latch 42 that functions as a locking part. The latch 42 is locked to a striker 43 as a to-be-locked part provided on a lower surface of the front end center portion of the hood 1. Locking the latch 42 to the striker 43 enables the hood 1 to be kept closed such that the hood 1 covers the engine room E of the vehicle body (see FIG. 6A).

Figure 4:
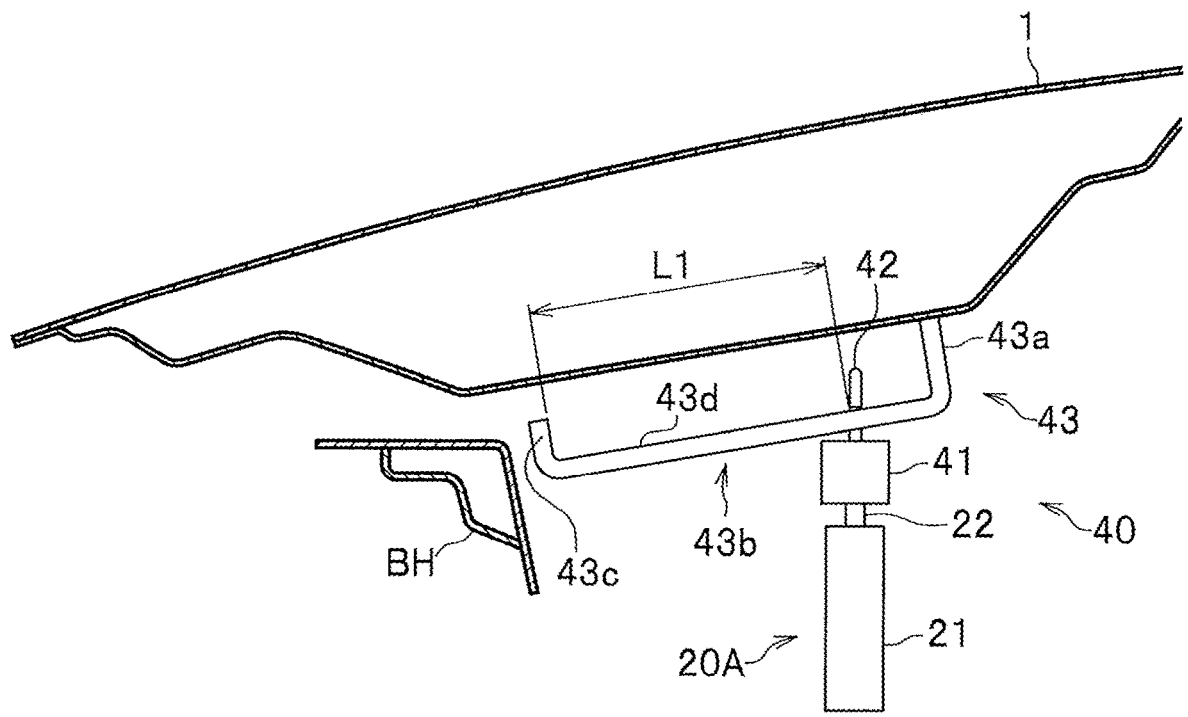
FIG. 4 is an enlarged side view illustrating a state in which a latch is locked to a striker.

As shown in FIG. 4, the striker 43 has a recessed cross section when viewed from the lateral side. The striker 43 includes: a support portion 43a that is supported by a front end lower portion of the hood 1; an extension portion 43b that extends forwardly of a front end portion of the support portion 43a; and a rising portion 43c that extends upwardly of a front end portion of the extension portion 43b.

The latch 42 is locked to and slidable on the extension portion 43b in the front-rear direction. That is, the extension portion 43b can be slid and shifted in the front-rear direction while being kept locked to the latch 42. The extension portion 43b includes an elongated portion 43d that extends forwardly of a site where the latch 42 is locked and has a longer front portion than an extension portion of each common striker 43.

The length L1 of the elongated portion 43d in the front-rear direction is set to a length (an expected length allowing the hood 1 to be shifted rearward) such that the hood 1 is permitted to be shifted rearward by a predetermined distance. This makes it possible for the hood 1 to be shifted rearward by the length L1 of the elongated portion 43d while the latch 42 is kept locked to the extension portion 43b.

As shown in FIG. 1, each driven actuator 20B is a member for supporting the lower side of either a left or right front end portion 1a of the hood 1. The driven actuators 20B are driven when the main actuator 20A is actuated and support the hood 1 from both the left and right sides. As shown in FIG. 2, each driven actuator 20B is arranged rearwardly of the main actuator 20A when viewed from the lateral side of the vehicle body. Note that each driven actuator 20B may be arranged on a line in the left-right direction of the main actuator 20A or may be arranged forwardly of the main actuator 20A.

Figure 3B:
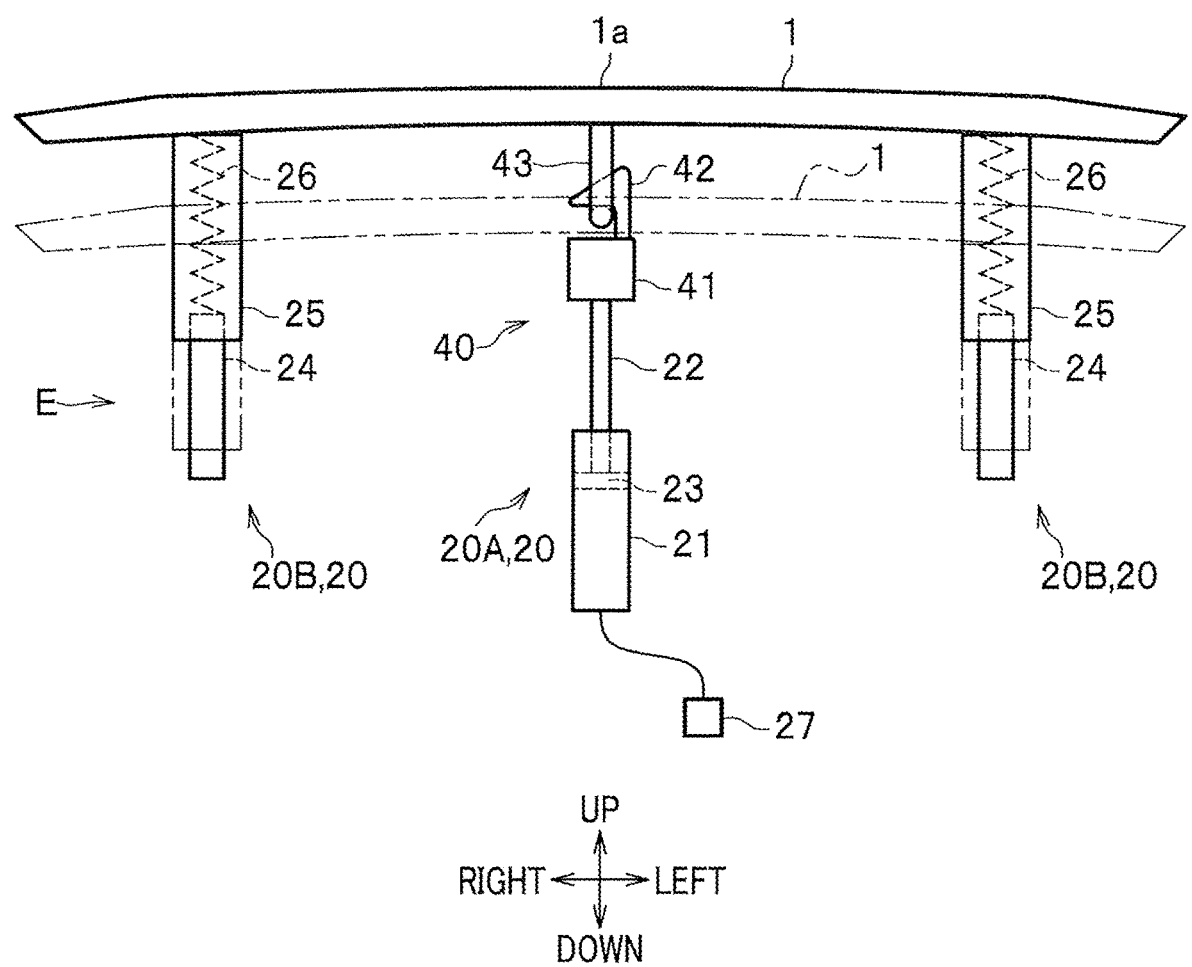
FIG. 3B is a schematic diagram illustrating a state in which the front actuator is operated.

The left and right driven actuators 20B have the same configuration, so that the left-side driven actuator 20B is herein described as an example. As shown in FIGS. 3A and 3B, the driven actuator 20B includes: a support rod 24; a bottomed cylinder body 25 that can be shifted vertically along the support rod 24; and a spring 26 that is biased and provided between an upper end of the support rod 24 and the bottom of the cylinder body 25.

The driven actuator 20B is configured such that the lock mechanism (not shown) is used to lock the cylinder body 25 to the support rod 24 while the spring 26 is being biased. The lock mechanism is used to unlock the cylinder body 25 from the support rod 24 by a mechanical unlocking means using a wire (not shown), etc., connected to the main actuator 20A or an electrical unlocking means using an electric signal, etc. As described below, the lock mechanism of the driven actuator 20B is unlocked to stretch the biased spring 26 and urge the cylinder body 25 upward by using its biasing force (see FIG. 3B). In this case, the driven actuator 20B may be actuated stepwise after the main actuator 20A is actuated or may be actuated at the same time when the main actuator 20A is actuated. Note that the cylinder body 25, which has been shifted upward, should be held at a predetermined height.

As shown in FIG. 1, a pair of rear actuators 30 are arranged on the left and right lower sides of the rear end portion of the hood 1. The pair of rear actuators 30 have the same configuration, so that the left-side rear actuator 30 is hereinafter described as an example.

Figure 5A:
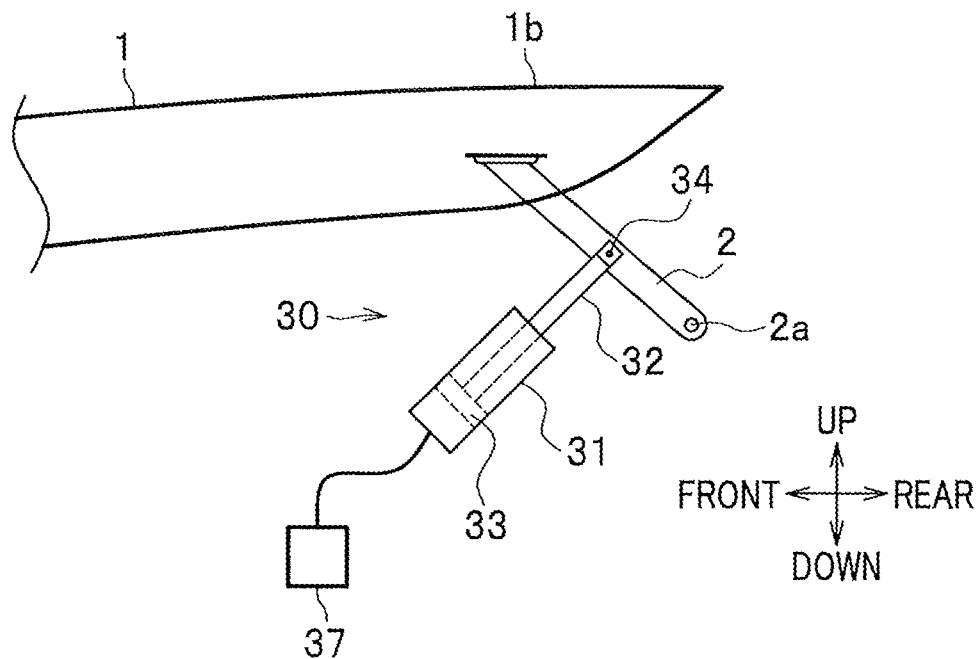
FIG. 5A is an enlarged side view illustrating the structure of a rear end portion of the hood.

As shown in FIG. 5A, the rear actuator 30 includes a tubular cylinder 31 and a rod 32 that can be displaced in the axial direction of the cylinder 31. The cylinder 31 houses a piston part 33 that is slidable in an axial direction. One end of the rod 32 is connected to this piston part 33. The rod 32 extends rearwardly and upwardly of the cylinder 31 and the other end thereof is arranged, via a pivot 34, close to a metal hinge 2 used to open or close the hood. A lower end portion of the hinge 2 is supported via a shaft portion 2a onto the vehicle body side and an upper end portion thereof is fixed to the hood 1.

Note that either the vehicle left- or right-side rear actuator 30 may be provided and connected to the hinge 2.

As shown in FIG. 3A, the cylinder 21 of the front actuator 20 is connected to an inflator 27, which injects gas into the inside of the cylinder 21. Meanwhile, as shown in FIG. 5A, the cylinder 31 of the rear actuator 30 is connected to an inflator 37, which injects gas into the inside of the cylinder 31.

The inflators 27 and 37 are pyro-type ones using a gas generator. The inflators 27 and 37 are triggered by a command from a control unit 52 of the below-described collision detection device 50 so as to inject gas.

Gas from the inflator 27 should be injected into the cylinder 21 of the main actuator 20A of the front actuator 20. In this case, as shown in FIG. 3B, the gas pressure causes the piston part 23 to slide upward, thereby moving the rod 22 upward. Upon this rod 22 movement, the whole locking device 40 is lifted upward. Specifically, while the latch 42 of the base part 41 is kept locked to the striker 43 on the hood 1 side, the locking device 40 and the front portion of the hood 1 are integrally lifted.

Figure 5B:
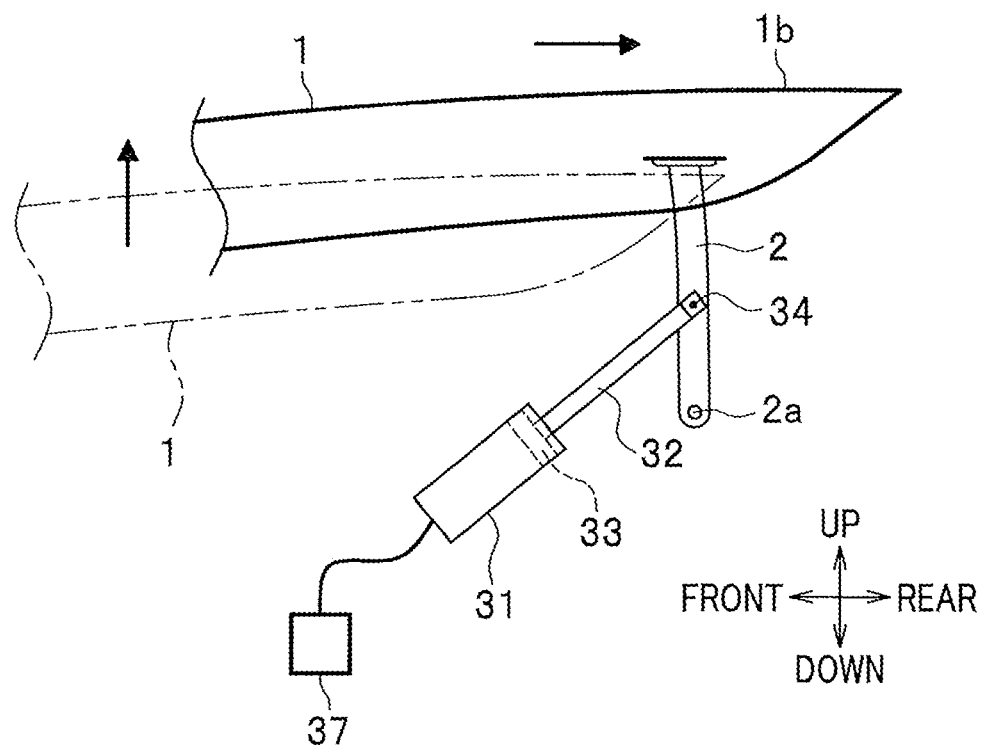
FIG. 5B is an enlarged side view of the rear end portion of the hood and indicates a state in which a rear actuator is operated.

In addition, gas from the inflator 37 should be injected into the cylinder 31 of the rear actuator 30. In this case, as shown in FIG. 5B, the gas pressure causes the piston part 33 to slide rearward and upward, thereby moving the rod 32 rearward and upward. Upon this rod 32 movement, the hinge 2 is pushed rearward and rotated. While being pushed rearward by the rod 32 and rotated, the hinge 2 undergoes a plastic deformation (the hinge 2 becomes not straight, see FIG. 5B) and is then left standing. In this way, the hinge 2 is left standing, so that the rear end portion 1b of the hood 1 is dislocated upward and rearward relative to the vehicle body. Note that as shown in FIG. 4, the striker 43 of the locking device 40 is slidably locked to the latch 42 such that the hood 1 is permitted to shift rearward. Thus, during the process of causing the hinge 2 to be left standing, the latch 42 suitably slides on the extension portion 43b of the striker 43. This allows the hood 1 to be smoothly dislocated rearward.

Next, the collision detection device 50 is explained. As shown in FIG. 1, the collision detection device 50 includes: a camera 51 as a detector directed forward over a front window W; and a control unit 52 as a control means arranged at a suitable site in the engine room E, etc.

The camera 51 may be, for instance, an infrared camera or a commonly known camera used to capture an image. The camera 51 captures a vehicle front image over the hood 1 and thus detects a vehicle front situation. In addition, the camera 51 may be a camera used for an advanced driver-assistance system for assisting a driver's driving operation. The advanced driver-assistance system is a system that has been developed to automate, apply, and reinforce a vehicle system for safe and better driving.

The control unit 52 is configured to receive image data captured by the camera 51 and predict whether or not there is a protection target (hereinafter, simply referred to as a "pedestrian") such as a pedestrian (including a bicycle rider, etc.) who may approach, for instance, a traveling vehicle V and collide with a front end portion 1a of the hood 1. In this case, the control unit 52 calculates, for instance, every prescribed time, a change in how large the image (area) of the pedestrian who is positioned either close to or far from the front portion of the hood 1, and thus predicts whether or not there is a pedestrian who may collide with the front end portion 1a of the hood 1.

The control unit 52 sends, when the presence of a pedestrian who may collide with the front end portion 1a of the hood 1 is predicted, a triggering signal to the inflators 27 and 37 (see FIGS. 3A and 5A).

Note that a pressure sensor for detecting a collision with the front end (e.g., a bumper) of the vehicle body may be arranged and the control unit 52 may be configured to detect an actual collision based on a signal from this pressure sensor.

The following describes an operation when the pedestrian collides with the front end portion of the vehicle body.

First, the ignition of the vehicle V, for example, is turned on and the driving is made possible. Next, the camera 51 of the collision detection device 50 starts capturing a vehicle front image. Then, the control unit 52 receives image data captured by the camera 51. The control unit 52, based on the received image data, starts predicting whether or not there is a pedestrian who may collide with the front end portion 1a of the hood 1.

The control unit 52 sends, when the presence of a pedestrian who may collide with the front end portion 1a of the hood 1 is predicted, a triggering signal to the inflators 27 and 37. Subsequently, the inflators 27 and 37 are triggered. As shown in FIG. 3B, this causes the inflator 27 to inject gas into the cylinder 21 of the main actuator 20A, thereby causing the piston part 23 to slide upward and thus moving the rod 22 upward so as to lift the whole locking device 40 upward. Accordingly, the main actuator 20A lifts the front end center portion of the hood 1 at a predetermined height.

This main actuator 20A is so actuated and the lock mechanisms of the pair of left and right driven actuators 20B are then unlocked. This causes each cylinder body 25 to be urged upward by using biasing force of each spring 26. Each cylinder body 25, which has been moved upward, is held at a predetermined height and supports the bottom of the left or right front end portion of the hood 1 so as to assist the operation of the main actuator 20A.

Meanwhile, as shown in FIG. 5B, the inflator 37 injects gas into the cylinder 31 of the rear actuator 30, thereby causing the piston part 33 to slide rearward and upward and thus moving the rod 32. This rod 32 pushes the hinge 2, so that the hinge 2 stands up with plastic deformation and is then left standing. This causes the rear portion of the hood 1 to be lifted upward and dislocated rearward. During this process, the latch 42 is slid on the extension portion 43b of the striker 43 and the hood 1 is dislocated rearward by a prescribed distance.

Note that each driven actuator 20B supports the left or right front end portion of the hood 1 such that the hood 1 is permitted to shift rearward.

Figure 6A:
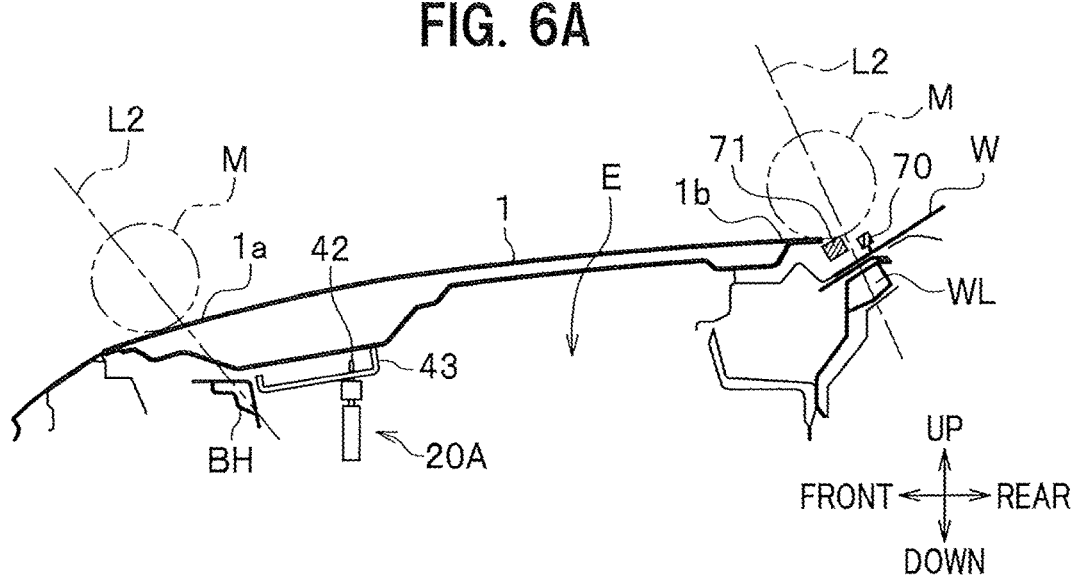
FIG. 6A is a cross-sectional view of the hood and its surroundings and indicates a state before pop-up operation.
Figure 6B:
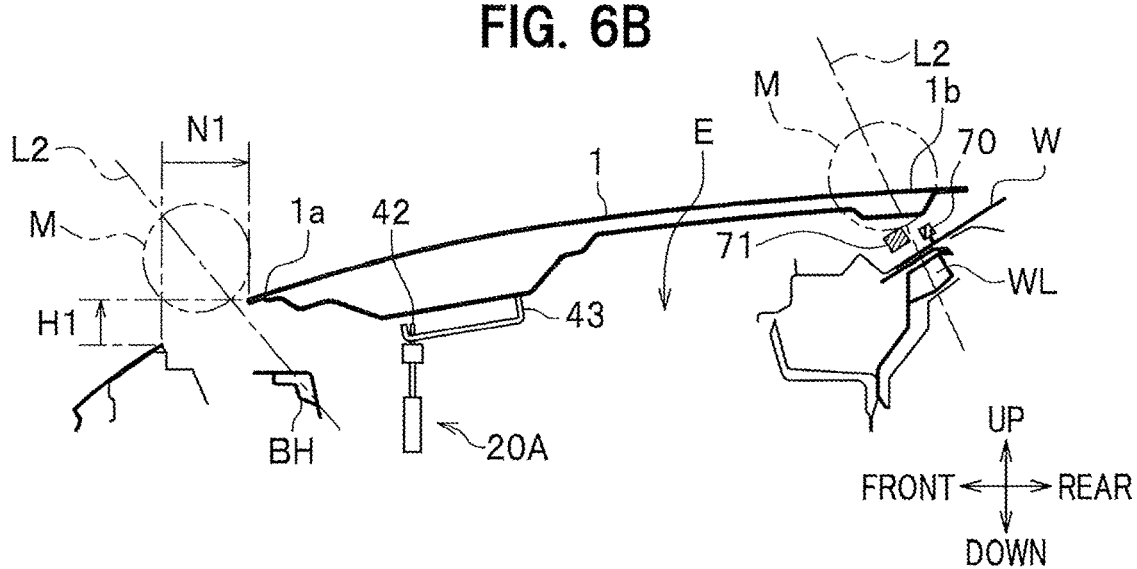
FIG. 6B is a cross-sectional view of the hood and its surroundings and indicates a state in which the rear end portion of the hood is positioned over a windshield lower and a wiper.
Figure 6C:
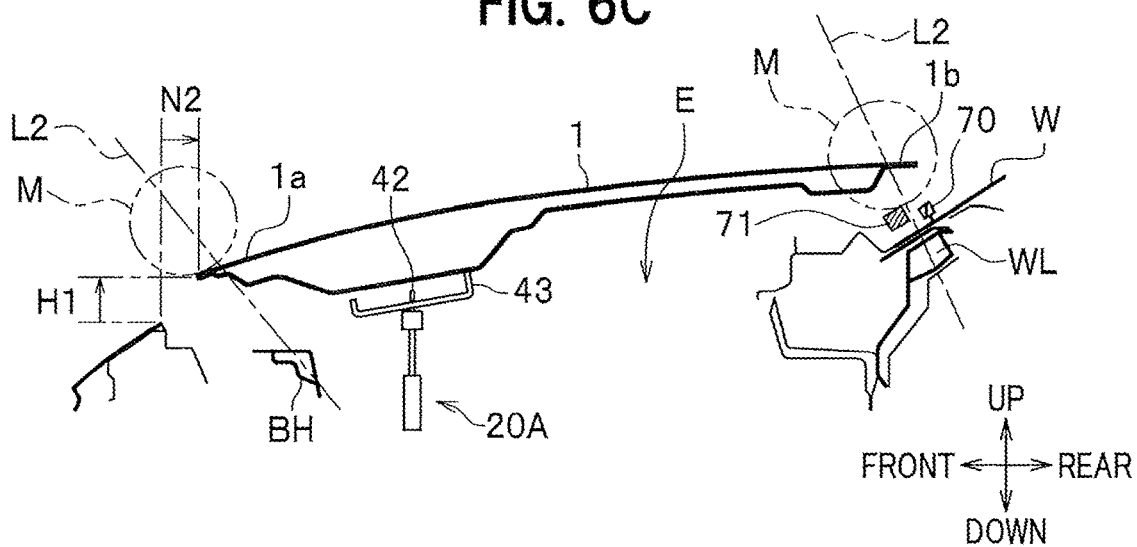
FIG. 6C is a cross-sectional view of the hood and its surroundings and indicates a state in which the rear end portion of the hood is positioned over a windshield lower and a wiper and a front end portion of the hood is positioned over a front bulkhead at a front section of the vehicle body.

FIGS. 6A to 6C are schematic diagrams illustrating how each test looks like when a given impact load is applied to the hood 1. The impact load is set based on a pedestrian head protection performance test, which is defined in a Japanese car assessment program (JNCAP). This test is executed such that a head impactor M, which is a collision body mimicking a head, is released from a tester and is made to collide with the hood 1. Each line L2, which is indicated by a dashed-dotted line in each figure, denotes a collision trajectory of the head impactor M.

In a normal state where the hood 1 is closed at the front section of the vehicle body as shown in FIG. 6A, the wiper 70 and its support part 71, which are arranged at a lower portion of the front window W, are positioned rearwardly of the rear end portion 1b of the hood 1 and are exposed to the outside. Due to this state, a collision trajectory of the head impactor M overlaps the wiper 70, etc., and the wiper 70 and the support part 71 are thus positioned on the collision trajectory. Consequently, the head impactor M may collide with them. In addition, the windshield lower WL, which has high rigidity and is positioned at a lower portion of the front window W, is also positioned on the collision trajectory of the head impactor. Consequently, the head impactor M may collide indirectly with the windshield lower WL. Note that because the hood 1 is closed, the front bulkhead BN, which is provided at the front section of the vehicle body, is covered by the front end portion 1a of the hood 1.

Next, FIG. 6B is described. By using the vehicle body structure of this embodiment, described is a case where the hood 1 is shifted upward by a height H1 and rearward by a distance N1 relative to the vehicle body. In FIG. 6B, the distance N1, which is how much the hood 1 is shifted rearward, is large, so that the rear end portion 1b of the hood 1 covers the wiper 70 and the support part 71 in the vertical direction. In addition, the rear end portion 1b of the hood 1 also covers the windshield lower WL in the vertical direction. Accordingly, the rear end portion 1b of the hood 1 is positioned on the collision trajectory of the head impactor M, which trajectory overlaps the wiper 70, etc. This makes it possible to enlarge a clearance between the engine room E and the hood 1 so as to reduce an impact when a pedestrian collides with the vehicle body and suitably prevent a collision between the pedestrian and the windshield lower WL and/or the wiper 70, etc.

Note that the front bulkhead BH, which is provided at the vehicle body front section, is positioned on a collision trajectory of the head impactor M, which trajectory overlaps the front bulkhead BH. However, at least part of the front end portion 1a of the hood 1 covers the front bulkhead BH in the vertical direction. Hence, this can suitably prevent a pedestrian from colliding with the front bulkhead BH.

Next, FIG. 6C is described. By using the vehicle body structure of this embodiment, described is a case where the hood 1 is shifted upward by a height H1 and rearward by a distance N2 relative to the vehicle body. In FIG. 6C, the distance N2, which is how much the hood 1 is shifted rearward, is set to be shorter than the above distance N1. Here, the rear end portion 1b of the hood 1 covers at least part of the wiper 70, the support part 71, and the windshield lower WL in the vertical direction.

In this case, the rear end portion 1b of the hood 1 is still positioned on a collision trajectory of the head impactor M, which trajectory overlaps the wiper 70, etc. This makes it possible to enlarge a clearance between the engine room E and the hood 1 so as to reduce an impact when a pedestrian collides with the vehicle body and suitably prevent the collision between the pedestrian and the windshield lower WL and/or the wiper 70, etc.

In addition, at the vehicle body front section, the front end portion 1*a* of the hood 1 is positioned on a collision trajectory of the head impactor M, which trajectory overlaps the front bulkhead BH. Hence, this can suitably prevent a pedestrian from colliding with the front bulkhead BH.

In the vehicle body structure of this embodiment as described above, the hood 1 is shifted upward and rearward relative to the vehicle body by using the shift mechanism. This makes it possible to enlarge a clearance between the engine room E and the hood 1 so as to reduce an impact when a pedestrian collides with the vehicle body and suitably prevent the collision between the pedestrian and the windshield lower WL and/or the wiper 70, etc. Hence, pedestrian protection performance is improved.

In addition, the shift mechanism shifts the hood 1 to a position where the hood 1 and at least part of the wiper 70, etc., overlap in the vertical direction. Consequently, the wiper 70, etc., is suitably covered by the rear end portion 1*b* of the hood 1, thereby capable of suitably preventing a pedestrian from colliding with the wiper 70, etc. Hence, pedestrian protection performance is improved.

In addition, the shift mechanism shifts the hood 1 to a position where the hood 1 and at least part of the windshield lower WL overlap in the vertical direction. Consequently, the windshield lower WL is suitably covered by the rear end portion 1*b* of the hood 1, thereby capable of suitably preventing a pedestrian from colliding with the windshield lower WL. Hence, pedestrian protection performance is improved.

In addition, under a state where the hood 1 is shifted upward and rearward relative to the vehicle body by the shift mechanism, the hood 1 and at least part of the front bulkhead BH overlap in the vertical direction. Consequently, the front bulkhead BH is suitably covered by the front end portion 1*a* of the hood 1, thereby capable of suitably preventing a pedestrian from colliding with the front bulkhead BH. Hence, pedestrian protection performance is improved.

Meanwhile, the latch 42 is locked to and slidable on the extension portion 43*b* of the striker 43 of the locking device 40. Accordingly, while the latch 42 is being locked to the extension portion 43*b*, the hood 1 can be dislocated rearward. This simple structure makes it possible to shift the hood 1 rearward.

The striker 43 of the shift mechanism includes the elongated portion 43*d*. This elongated portion 43*d* may be used to keep the latch 42 locked on the extension portion 43*b*, so that the hood 1 can be dislocated rearward.

Second Embodiment

Figure 7:
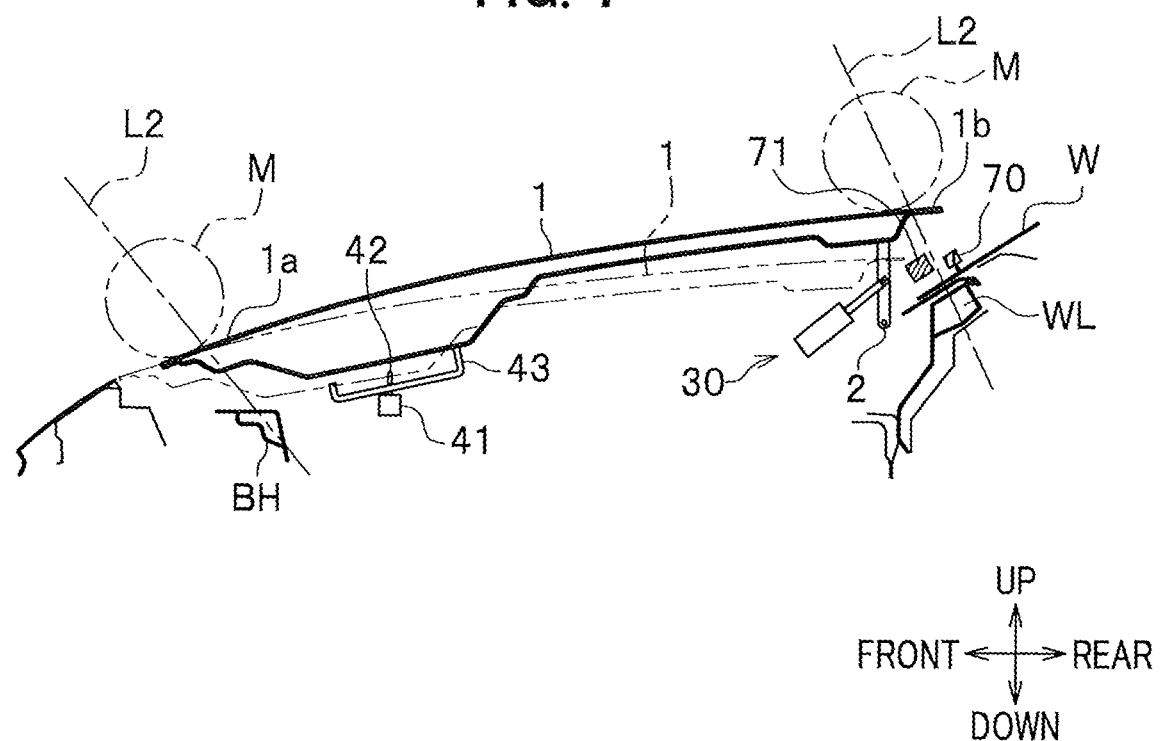
FIG. 7 is a cross-sectional view of a hood and its surroundings and indicates a vehicle body structure according to a second embodiment of the present invention.

With reference to FIG. 7, the following describes a vehicle body structure according to a second embodiment. This embodiment differs from the first embodiment in a point where the shift mechanism includes only the rear actuator 30.

In this vehicle body structure, a rear portion of the hood 1 is provided with the rear actuator 30. This makes it possible to shift the rear portion of the hood 1 upward and rearward. Here, the rear end portion 1*b* of the hood 1 may be positioned on a collision trajectory of the head impactor M, which trajectory overlaps the wiper 70, etc.

Note that the front end portion 1*a* of the hood 1 can be shifted rearward while the latch 42 is being locked to the extension portion 43*b* by the locking device 40.

This embodiment also makes it possible to enlarge a clearance between the engine room E and the hood 1 so as to reduce an impact when a pedestrian collides with the vehicle body and suitably prevent the collision between the pedestrian and the windshield lower WL and/or the wiper 70, etc.

In the second embodiment, the shift mechanism shifts at least one of the front portion and the rear portion of the hood 1 upward and rearward.

Hereinabove, the vehicle body structures according to the embodiments of the present invention have been illustrated by referring to the Drawings. However, the present invention is not limited to them and can be suitably modified without departing from the spirit of the present invention.

For instance, the rear actuator 30 is configured to move the rod 32 rearward and upward. The present invention is not limited to this configuration. The configuration may include two actuators: an actuator for moving the rear end portion 1*b* of the hood 1 upward; and an actuator for moving the rear end portion 1*b* of the hood 1 rearward.

In addition, the front actuator 20 has been described which causes the front end portion 1*a* of the hood 1 to shift, together with the locking device 40, upward. The present invention is not limited to this configuration. The actuator may be configured to cause the front end portion 1*a* of the hood 1 to shift, together with the locking device 40, rearward and upward. In this case, there is no need to provide the elongated portion 43*d* to the extension portion 43*b* of the striker 43.

In addition, the latch 42 of the locking device 40 has been provided on the vehicle body side and the striker 43 has been provided on the hood 1 side. By contrast, the latch 42 may be provided on the hood 1 side and the striker 43 may be provided on the vehicle body side.

In addition, in the above embodiments, a hood of the vehicle body structure is referred to as and applied to the hood 1. The present invention is not limited to this configuration. The hood may be applied to a trunk hood at a rear section of the vehicle body and other hoods.

In addition, the camera 51 has been used as the detector. The present invention is not limited to this configuration. A radar device and/or a pressure sensor may be used to detect a pedestrian.

In addition, the present invention may be widely applicable to hybrid vehicles and energy-storage-carrying vehicles such as electric vehicles and fuel cell vehicles.

In addition, the shift mechanism shifts substantially in parallel (translates) the hood 1 upward and rearward. The hood 1 comprises a hinge (not shown). The hinge may be separated from the shift mechanism. However, the hinge may be combined with the shift mechanism.

REFERENCE SIGNS LIST

1 Hood
20 Front actuator (Shift mechanism)
30 Rear actuator (Shift mechanism)
40 Locking device
42 Latch (Locking part)
43 Striker (To-be-locked part)
43*d* Elongated portion
70 Wiper
BH Front bulkhead
V Vehicle
W Front window
WL Windshield lower

The invention claimed is:

1. A vehicle body structure comprising:
a hood provided at a vehicle body;
a shift mechanism by which the hood is shifted relative to the vehicle body; and
a locking device configured to lock the hood to the vehicle body;
wherein the shift mechanism supports the hood movable with respect to the vehicle body and shifts the hood upward and rearward with respect to the vehicle body;
wherein the locking device comprises:
a locking part provided at one of the vehicle body and the hood; and
a to-be-locked part locked, slidably in a front-rear direction, to the locking part provided at the other, and
wherein the shift mechanism comprises a front actuator which causes the locking part and the to-be-locked part, which are locked, and a front end portion of the hood to shift upward.

2. The vehicle body structure according to claim 1, wherein the vehicle body comprises a wiper configured to wipe a front window; and
wherein the shift mechanism shifts the hood to a position where the hood and at least part of the wiper overlap in a vertical direction.

3. The vehicle body structure according to claim 1, wherein the vehicle body comprises a windshield lower configured to support a front window from a lower side; and
wherein the shift mechanism shifts the hood to a position where the hood and at least part of the windshield lower overlap in a vertical direction.

4. The vehicle body structure according to claim 1, wherein a front section of the vehicle body comprises a front bulkhead extending in a vehicle body left-right direction; and
wherein under a state where the hood is shifted upward and rearward relative to the vehicle body by the shift mechanism, the hood and at least part of the front bulkhead overlap in a vertical direction.

5. The vehicle body structure according to claim 1, wherein the shift mechanism is configured to shift the hood rearward by a predetermined distance relative to the vehicle body; and
wherein the to-be-locked part includes an elongated portion that is extended forward by the predetermined distance from a site where the locking part is locked thereto.

* * * * *